UNITED STATES PATENT OFFICE.

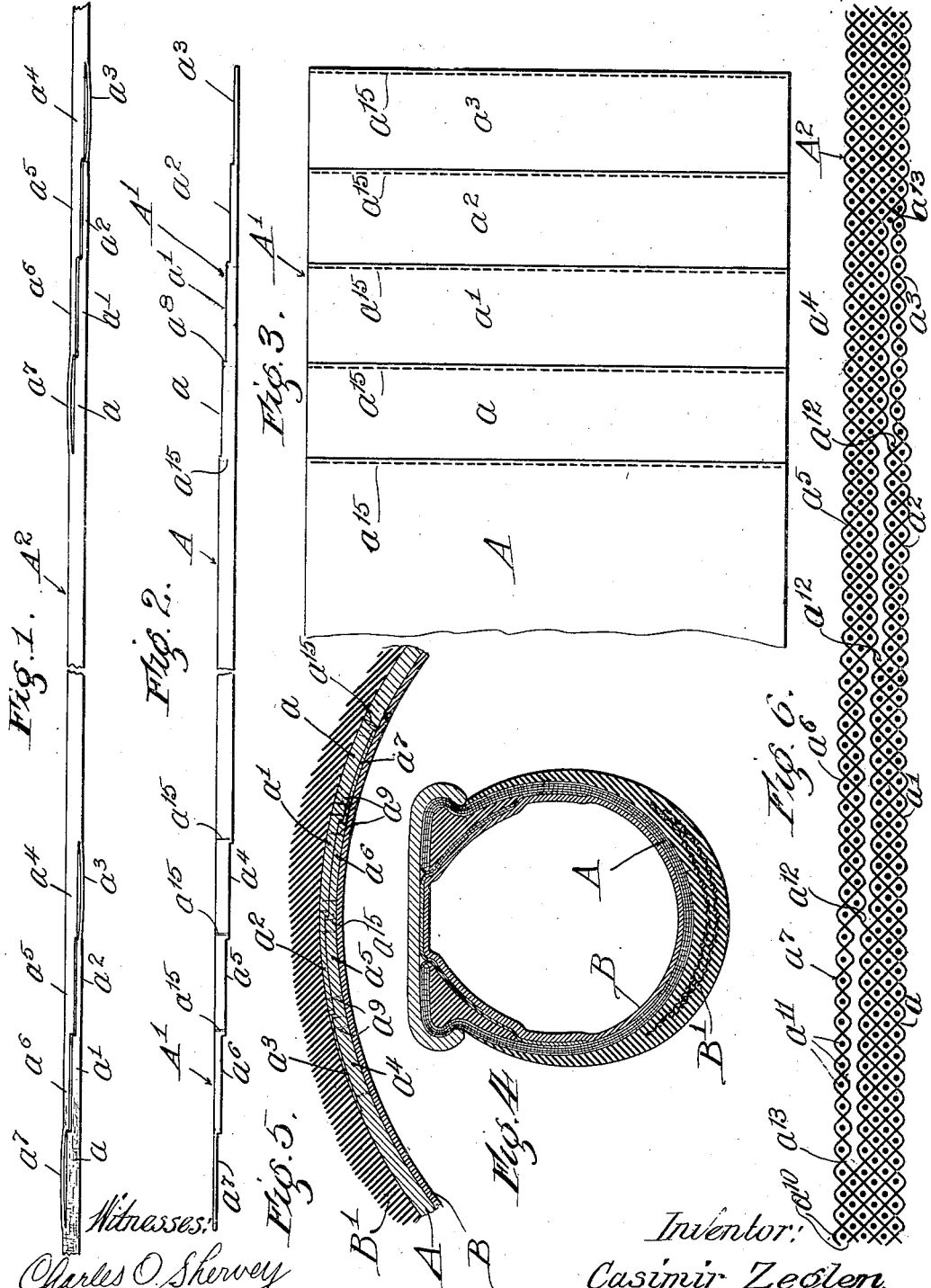

CASIMIR ZEGLEN, OF CHICAGO, ILLINOIS, ASSIGNOR TO CHARLES A. DANIEL, OF PHILADELPHIA, PENNSYLVANIA.

TIRE-REINFORCING FABRIC AND METHOD OF MAKING SAME.

977,357.  Specification of Letters Patent.  Patented Nov. 29, 1910.

Application filed July 2, 1909. Serial No. 505,579.

*To all whom it may concern:*

Be it known that I, CASIMIR ZEGLEN, a citizen of the United States, and a resident of Chicago, in the county of Cook and State of Illinois, have invented certain new and useful Improvements in Tire - Reinforcing Fabric and Methods of Making the Same; and I do hereby declare that the following is a full, clear, and exact description thereof, reference being had to the accompanying drawings and to the letters of reference marked thereon, which form a part of this specification.

This invention relates to a novel multi-ply fabric strip having stepped or offset marginal parts adapted to be joined in matched relation to another stepped marginal part of the same or another strip to produce a compact joint between the matched marginal parts no thicker than the body of the fabric at the sides of the joint; to a novel woven multi-ply fabric web embracing a plurality of such strips and from which the individual strips are produced, and to a novel process of producing said strip and said web.

One of the objects of the invention is to provide means for joining in overlapping relation the margins of a strip or strips of a multi-ply fabric in such manner as to avoid an objectionable thickness or fullness at the joint between the overlapped margins, while maintaining the full strength and thickness of the fabric at the joint. In order to produce this result I propose to so weave the marginal parts of the fabric strip or strips to be thus joined as to produce in the overlapping portions thereof a series of finished or woven steps or offsets of varying or decreasing thickness from the inner to the outer or terminal parts of the overlapping portions, which steps or offsets are separated by shoulders. The stepped margins are so matched that when brought together in overlapping relation each step of each overlapping margin will lie over and be attached to another step of the other overlapping margin of such thickness that each two overlying steps will together be equal in thickness to that of the main body of the fabric at the sides of the joint. All of the steps are thus matched and produce an overlapping joint which is uniform in thickness throughout the overlapping joint and of the same thickness as the strip or strips joined. The said overlapping matched margins are stitched or otherwise fastened together.

A further object of the invention is to provide a continuous web of woven fabric of considerable length from which are to be cut a number of shorter strips or sections having the woven stepped or offset lapping margins or ends of the character described, the said stepped portions of adjacent strips or sections to be cut from said web being woven in superposed or overlapping relation in the body of the fabric and being separated or split from each other, except at the lateral sides of the steps or at the shoulders between the steps of different thicknesses. The web thus woven is divided into the shorter strips or sections by cutting the strands which bind the overlapping stepped portions at the lateral sides of the steps, thus leaving the stepped portions in readiness to be matched to mating stepped portions.

My invention is adaptable for use in a variety of instances where it is desired to join two overlapping strips of fabric or two margins of the same strip in overlapped relation. For instance, the invention is especially adaptable for joining the ends of the reinforcing woven fabric strip, such as is used in the tire shown in my prior United States Letters Patent Number 876,616 issued on the 14th day of January 1908. The character of the weave of the fabric shown in said patent renders it peculiarly adaptable for producing the finished steps or offsets in the overlapping margins of the strip, as will hereinafter more fully appear. In this use of the invention, the ends of the fabric strip which constitutes the reinforcing member of the tire are joined without producing an objectionable thickness or fullness on the tread of the tire at the point of joining, and without the necessity of cutting the meeting ends of the fabric to produce a scarf joint. Furthermore a joint formed in the reinforcing web or fabric at the tread of the tire in accordance with my invention produces a connection which does not in any manner weaken or impair the reinforcing function of the fabric. Moreover the improved joint or connection may be used to join the two ends of a fabric strip to produce a belt or like continuous web for a variety of purposes or to join two such strips end to end.

As shown in the drawings, Figure 1 is a side view, broken away, of a woven fabric web, made up of a plurality of integrally woven strips, each having at its end a lapping portion embracing a series of varied thickness steps. Fig. 2 is a side view, broken away, of a strip cut from the web shown in Fig. 1. Fig. 3 is a plan view of one of the stepped ends of the strip shown in Fig. 2. Fig. 4 is a cross section of a vehicle wheel tire, showing one manner of applying thereto a reinforcing fabric embodying my invention. Fig. 5 is a fragmentary sectional view of a tire tread, showing the overlapping matched ends of a reinforcing fabric. Fig. 6 is an enlarged sectional view of a multi-ply fabric, showing the manner of weaving the steps in the body of the fabric.

In said drawings A designates a strip of woven fabric, which may be made of any desired length and width, and $A'$, $A'$ designate the end margins of the strip which are adapted to be placed together in overlapping relation in the manner shown in Fig. 4 to produce from the continuous strip an endless web. $a$, $a'$, $a^2$, $a^3$, $a^4$, $a^5$, $a^6$, $a^7$, designate the stepped or offset portions of the overlapping ends, there being four of such stepped or offset portions at each end of the strip. A greater or less number of steps or offsets may be provided as desired. The said steps or offsets extend transversely across the overlapping ends of the strip and are of varying thickness from the inner to the outer ends or terminals of the overlapping end portions, the terminal steps $a^3$, $a^7$ being made thinnest, and the steps increasing in thickness from said terminal steps to the inner or thickest steps $a$, $a^4$ adjacent to the main body portion of the strip. The series of steps at one end of the strip are formed on the upper side of the strip while those at the other end of the strip are formed on the lower side thereof. Thus when the ends of the strip are brought together in overlapping relation, as shown in Fig. 5, the thinnest or terminal steps $a^3$, $a^7$, will lie one over and the other beneath the thickest inner steps $a$, $a^4$, while the intermediate steps $a'$, $a^2$ at one end of the strip will match with the similar intermediate steps $a^5$, $a^6$ of the other end of the strip. Each two steps or offsets thus brought together at the overlapping ends of the strip are of a combined thickness equal to that of the body of the strip, as plainly shown in Fig. 5. Between each two adjacent steps or offsets is formed an abrupt shoulder $a^8$, and when the overlapping parts are brought together in the manner shown in Fig. 5 the said shoulders are placed in close abutting relation so that the fabric is continuous or uninterrupted throughout the overlapping parts of the strip. The overhanging parts of the strip may be secured together by lines of stitches $a^9$ which may be arranged transversely of the strip or otherwise. As herein shown, and as preferably arranged, two lines of stitches will be placed closely adjacent to the abutting shoulders $a^8$. The several steps are each formed with a finished weave at their upper and lower sides and possess, therefore, the same firmness of texture as do the other parts of the fabric.

In accordance with one feature of my invention a number of the strips A, with their stepped or offset overlapping ends, are woven as integral or continuous parts of a multi-ply fabric web $A^2$, as shown in Figs. 1 and 6, and the stepped or offset parts $a$ to $a^7$, inclusive, are finished or completed by a special mode of weaving in the body of the fabric in superposed or overlying relation, the steps being split or separated from each other and the upper and lower steps being separately, but simultaneously woven and finished in the same general matched relation as when the two overlapped ends of a strip are secured together. The web is separated at these points to produce the individual strips A and the upper and lower offset portions at each point of separation belong to two adjacent strips.

The manner in which the separate, finished steps are formed in the body of the fabric is most clearly shown in Fig. 6, the fabric being like that illustrated in my aforesaid prior United States Letters Patent, No. 876,616. The character of the weave of this fabric lends itself with peculiar adaptability to the formation of the offsets or steps, and is, for this reason, preferred. It will be understood however that the invention, in its broader phase is not limited to any particular weave. The fabric therein shown is a multi-ply fabric, it consisting of a series of superposed weft or filling threads $a^{10}$ and a plurality of warp threads $a^{11}$, which latter are interlaced with the filling threads in such manner that all of said warp threads extend entirely through the fabric from the upper to the lower sides thereof to bind the filling threads in a compact mass of single thickness. The arrangement is such as to make it practicable to weave complemental or offset steps simultaneously, each step being independently woven during the simultaneous, independent weaving of a complemental step.

In weaving the main body of the fabric the shuttle controlling mechanism of the loom may be so adjusted with respect to the harness controlling mechanism that the filling or weft threads may be woven in the fabric by the use of a single shuttle, the shuttle being thrown for each set of filling threads a number of times, in each cycle of operation of the harness, equal to the number of plies of the fabric. Two shuttles alternately thrown may also be employed. For forming the several steps or offsets in the web $A^2$ at the places where the steps occur two shuttles and two shuttle boxes may be employed, one shuttle for throwing the filling threads through the sheds of the warp threads of the lower steps of the web and the other shuttle for throwing the filling threads through the sheds of the warp threads of the upper steps or offsets of the web which are simultaneously woven; and the shuttle and harness controlling mechanisms will be changed or adjusted for each two simultaneously woven steps or offsets to properly control the throw of the shuttles and the dropping of the set of warp threads for each pair of complemental steps or offsets to correspond with the number of plies therein. For instance in weaving the stepped portions in the fabric shown, the controlling mechanisms for the shuttles may be adjusted to throw the shuttle through the sheds formed between the alternately raised and lowered sets of warp threads of the single ply step $a^3$ or $a^7$ at least once for each four throws of the shuttle through the sheds formed between the warp threads of the other four plies of the thickest step $a$ or $a^4$. After the thinnest or single ply step at the lower side of the fabric, and the complemental four ply step at the upper side of the fabric has been thus formed, the shuttle and harness controlling mechanisms are adjusted or changed so as to drop one more set of the warp threads from the upper side of the fabric to the lower side thereof to weave the two ply step or offset $a^2$ at the lower side of the fabric and simultaneously weave the three ply step or offset $a^5$ at the upper side of the fabric. After the two ply step or offset $a^2$ and the complemental three ply step or offset $a^5$ has been completed another change of the shuttle and harness controlling mechanisms will be made to drop one more set of warp threads from the upper to the lower side of the fabric to weave the three ply step or offset $a'$ on the lower side of the fabric and simultaneously weave the two ply step or offset $a^6$ at the upper side of the fabric. Finally after the completion of the three ply step $a'$ at the lower side of the fabric and the two ply step at the upper side of the fabric another change or adjustment of the shuttle and harness controlling mechanisms is made to weave the lower side of the fabric the four ply offset or stop $a$ and to simultaneously weave therewith on the upper side of the fabric the single ply step or offset $a^7$. Thereafter the shuttle and harness controlling mechanisms are changed or adjusted to weave the single thickness body of the fabric, and in the latter adjustment the shuttle controlling mechanism may be adjusted to operate but a single shuttle during the subsequent weaving of the single thickness fabric, or two shuttles alternately.

At the changes from a thinner step to the next thicker steps the warp threads will be dropped from the upper side of the fabric to the lower side thereof, as indicated at $a^{12}$, Fig. 6, and thus bind together the marginal parts of the upper and lower superposed stepped parts of the fabric. In the arrangement described one warp thread is dropped from the upper to the lower side of the fabric at each change from a thinner to a thicker step. Likewise at the beginning and ending, respectively, of the single ply lower and upper steps $a^3$ and $a^7$ the warp threads of said single ply steps are carried into the body of the single thickness fabric as indicated at $a^{13}$. Between the parts $a^{12}$, $a^{13}$ of the warp threads thus carried over from one side of the fabric to the other the woven steps are split or separated from each other, each step being separately woven, as before stated. After the separately woven steps have thus been formed one strip may be disconnected or separated from the other by cutting the warp threads at the points $a^{12}$, $a^{13}$, such points occurring at the shoulders $a^8$ as before referred to. Stated in another way, the web may be said to be woven in a manner to provide at predetermined intervals in its length a plurality of pockets arranged in sets with the pockets of each set arranged in different planes, as clearly shown in Figs. 1 and 6, (which planes may be termed weft planes) so as to produce at the upper and lower sides of the pockets the steps of different thickness. The warp threads are cut at the sides of these pockets to produce the individual strips having the stepped or offset margins.

In some instances it is desirable to stitch the stepped portions of the fabric near the shoulders, as indicated at $a^{15}$, Figs. 2 and 3, to avoid tendency of the fabric raveling at the places where the strands $a^{12}$, $a^{13}$ are severed to produce the stepped end strips.

It will be understood that the fabric may be woven with a greater or less number of plies and a correspondingly greater or less number of steps or offsets. Moreover in some instances the main body of the fabric may be woven with a greater number of full regularly formed plies than at the stepped lapping margin thereof, in which latter event the extra warp thread may be irregularly woven into the stepped portions so that it will not appear as a full, regularly disposed ply. Moreover but one set of warp threads may be dropped from the fabric at the beginning of the weaving of the thinnest step, the single set of warp threads being divided to produce an ordinary cotton weave as in the construction described but with a lighter warp. The character of the weave of the two and more plies is that of a twill weave as the fabric shown is woven.

When the fabric herein described is employed as the reinforcing fabric of a tire it may be laid between the inner tube B of the tire and the sheath or shoe B' thereof as shown in my aforesaid patent, or may be otherwise disposed in the tire in a manner to reinforce the same against puncture or explosion.

I claim as my invention:

1. A multi-ply fabric strip for tire reinforcement and the like, comprising a compactly woven body having at its end margins steps or offsets of graduated thickness, the fabric body consisting of superposed filling threads and warp threads laced through the filling threads from one side of the fabric to the other, said steps or offsets being woven finished during the weaving of the fabric by displacement of the filling and warp threads.

2. A multi-ply fabric strip for tire reinforcement and the like, comprising a compactly woven body having uniform filling threads and having at its end margins steps or offsets of graduated thickness, said steps or offsets being woven finished by displacement of the filling and warp threads during the weaving of the fabric and the steps having the same compact finished texture as the body of the fabric.

3. A woven multi-ply fabric web for the purpose set forth, provided at predetermined intervals along its length with sets of pockets, with the pockets of each set arranged in different weft planes to produce at said pockets matched offsets or steps.

4. A woven multi-ply fabric web which is designed to be separated into a plurality of strips having steps or offsets woven in the ends thereof to form lapping end margins, the said steps of the margins being woven in the body of the web, with the stepped margin of one strip overlying in matched relation to, and split or separated from the stepped margin of an adjacent strip.

5. A woven multi-ply fabric web comprising superposed filling threads and warp threads all of which are interlaced through the filling threads from the upper to the lower side of the fabric, and which is designed to be separated into a plurality of strips having stepped or offset lapping end portions, the steps of each end portion comprising varying numbers of plies, said steps being woven in the body of the fabric web with the steps of each strip woven in overlying matched relation to the steps of an adjacent strip, and with the warp threads carried from one of said lapping portions to the other at the sides of said steps.

6. The method of producing a compact multi-ply woven fabric strip for tire reinforcement and like uses, provided at its end margins with steps or offsets of graduated thickness, which consists in weaving a fabric with superposed filling or weft threads, lacing all of the warp threads entirely through the fabric from one side thereof to the other, and weaving finished compactly woven steps in the fabric of graduated thickness during the weaving of the fabric, with all of the warp threads of each step laced entirely through the weft threads thereof from one side to the other to produce the same finished woven texture in the steps as in the main body of the strip.

7. The method of producing a plurality of woven strips having stepped marginal portions, which consists in weaving a multi-ply web, forming in the web at longitudinal intervals sets of pockets, with the pockets of each set in different weft planes, and dividing said web by cutting the warp threads at the sides of said pockets.

8. The method of producing a plurality of woven strips having stepped overlap portions, which consists in weaving a continuous elongated multi-ply web, forming in the web at suitable longitudinal intervals along the same overlapping, reversely stepped, matched portions and thereafter separating the strips by cutting the strands at said stepped portions.

9. The method of producing multi-ply fabric strips having lapping end margins formed with finished woven steps or offsets, which consists in weaving in a continuous web a plurality of such strips in end to end relation, with the stepped or offset margins woven in the body of the web by splitting or separating the plies of the web at the points of division of the strips to form superposed, matched steps of different thickness, weaving each step separate from its superposed step, dropping the warp threads from the upper to the lower side of the fabric as the steps are successively formed to increase the thickness or number of plies of the steps on the lower side of the fabric, and finally cutting the warp threads on the lines at which they are dropped from the upper to the lower side of the fabric to separate or divide the web into strips.

In testimony, that I claim the foregoing as my invention I affix my signature in the presence of two witnesses, this 26th day of June A. D. 1909.

CASIMIR ZEGLEN.

Witnesses:
W. L. HALL,
WILLIAM GOLDBERGER.